United States Patent
Shekhel et al.

(10) Patent No.: US 7,818,798 B2
(45) Date of Patent: Oct. 19, 2010

(54) SOFTWARE SYSTEM WITH CONTROLLED ACCESS TO OBJECTS

(75) Inventors: Jerry J. Shekhel, Swampscott, MA (US); Ryan M. Jansen, Bedford, MA (US); Seth D. Goldstein, Exeter, NH (US)

(73) Assignee: Microsoft Corporation, Redmond, WA (US)

( * ) Notice: Subject to any disclaimer, the term of this patent is extended or adjusted under 35 U.S.C. 154(b) by 1024 days.

(21) Appl. No.: 11/347,440

(22) Filed: Feb. 3, 2006

(65) Prior Publication Data

US 2007/0199000 A1   Aug. 23, 2007

(51) Int. Cl.
G06F 11/00 (2006.01)
H04L 9/32 (2006.01)

(52) U.S. Cl. .............................. 726/22; 726/26; 726/27
(58) Field of Classification Search .................. 726/22, 726/26–27, 30; 713/189–190, 193–194; 717/100, 107–108, 112, 114–118, 120, 126, 717/143
See application file for complete search history.

(56) References Cited

U.S. PATENT DOCUMENTS

| | | | |
|---|---|---|---|
| 6,182,277 | B1 | 1/2001 | Degroot et al. |
| 6,587,888 | B1 | 7/2003 | Chieu et al. |
| 2002/0004934 | A1 | 1/2002 | Toutonghi et al. |
| 2004/0054696 | A1 | 3/2004 | Sheinis et al. |
| 2005/0193269 | A1* | 9/2005 | Haswell et al. ............... 714/38 |

OTHER PUBLICATIONS

Strawmyer, M., .Net Remoting, Jupitermedia Corp. Oct. 10, 2002, pp. 1-3, downloaded from www.developer.com/net/cplus/article.php/1479761, on Apr. 28, 2006.

Deremer, B., Throwing Custom Exception Types from a Managed COM+ Server Application, . . . (11 pgs.) Microsoft Corp. and CMP Media, LLC, downloaded from http://msdn.microsoft.com/msdnmag/issues/04/03/ExceptionsinCOM/default.aspx?print=tr on Apr. 28, 2006.

(Continued)

Primary Examiner—Hosuk Song
(74) Attorney, Agent, or Firm—Wolf, Greenfield & Sacks, P.C.

(57) ABSTRACT

A computer system configured to intercept method calls placed on an object. By intercepting method calls, processing may be performed on a method call-by-method call basis. As part of the processing, metadata for an object is consulted to partition the methods for that object into subsets. The processing performed in response to any specific method call may be based on the subset to which the method belongs. The type of metadata may depend on the desired operation of the computer system. Metadata representing a white list or black list may be used in a computer system that implements a security zone that allows access to methods deemed to be safe or to deny access to methods deemed to be unsafe. In a performance monitoring system, metadata may identify methods to be logged or methods for which execution cost are to be measured. Values returned by a method call may also be processed when the method calls are intercepted. The returned value may be wrapped with a wrapper that holds data useful in implementing a security zone or for performing other processing.

19 Claims, 4 Drawing Sheets

OTHER PUBLICATIONS

*Java Remote Method Invocation (Java RMI)*, Sun Microsystems, Inc., 1 pg., downloaded from http://java.sun.com/oroducts/jdk/rmi/, on Apr. 28, 2006.

Liong, L.B., *Understanding The COM Single-Threaded Apartment Part 1*, CodeProject (1999-2006), pp. 1-35, downloaded from http://209.171.52.99/com/CCOMThread.asp?print=true, on Apr. 28, 2006.

International Search Report in PCT/US07/002671, dated Jul. 24, 2007, 8 pages.

Extended European Search Report from European Application No. 07763071.3.

Blümlinger et al., "Controlling Access to Distributed Object Frameworks," *Lecture Notes in Computer Science* vol. 2789/2003:184-187 (Oct. 22, 2003).

Oaks, Scott, "Java Security," Section 4.2, paragraph 1, O'Reilly & Associates, Inc., 101 Morris Street, Sebastopol, Calif. 95472, May 1998.

Riechmann et al., "Meta Objects for Access Control: Extending Capability-Based Security," *Proc. Of the New Security Paradigms Workshop. NSPW '97*, Langdale, UK, Sep. 23-26, 1997, New Security Paradigms Workshop, ACM vol. Conf. 6:17-22 (Sep. 23, 1997).

* cited by examiner

SOFTWARE SYSTEM WITH CONTROLLED ACCESS TO OBJECTS

BACKGROUND

In many software systems, access to certain objects may be restricted based on the context in which those objects are invoked. For example, a web browser, such as INTERNET EXPLORER® web browser provided by Microsoft Corporation, may restrict access to certain objects to implement a "security zone." Scripts downloaded from the Internet may be allowed to execute in the security zone, but those scripts may be denied access to objects that could disrupt operation of a computer on which the web browser is installed. Having a security zone allows a computer user to download scripts from the Internet or other un-trusted sources, while reducing the risk that such downloaded scripts, when executed on the computer, will cause damage either because they were inadvertently written improperly or maliciously written in a way to disrupt operation of the computer.

ActiveX® objects are one example of objects for which access may be restricted. A computer configured to execute scripts may contain multiple ActiveX® objects. Each ActiveX® object contains one or more interfaces. Each interface may have methods that can be called through the interface, allowing a script to call these methods to perform functions during execution of the script. Such functions may include presenting information on the display of the computer, accessing an e-mail system to send e-mail or altering files in the computer's file management system.

Some functions performed by ActiveX® objects, such as presenting output on a display of the computer, may generally be benign. Calls from a security zone on objects that expose only methods that perform such benign functions can be allowed. But, other functions, such as accessing a file management system, can cause damage to a computer if used within a script improperly or for malicious purposes. When implementing a security zone, calls on objects that expose methods that perform such detrimental functions are not allowed.

A mechanism is provided to limit access to certain objects when invoked from a security zone. For ActiveX® objects, this mechanism is an optional restricted interface, called IObjectSafety. An ActiveX® object that implements this interface can respond to a query from a host program executing a script to indicate that it has a "safe mode" of operation and can be instantiated in safe mode. Once instantiated in safe mode, calls may be made on the object through any of its interfaces. It is the responsibility of the ActiveX object to ensure that, when running in safe mode, no unsafe methods may be called. This feature allows a web browser to implement a security zone by only creating instances of ActiveX® objects that support a safe mode of operation, and by instantiating all such objects in safe mode.

SUMMARY OF INVENTION

Software for a computer system may be more powerful, more easily developed and less likely to grant access to objects that are intended to be restricted by providing an improved process for controlling access to objects. Preferably, the process does not require objects to be specifically implemented to perform the process, which simplifies use of the process and allows existing objects to be used in which a computer system according to the improved process.

In one aspect, the invention relates to a software system that can intercept method calls, allowing a method call to be processed either before or after it is executed. Calls may be intercepted by providing an interface component that receives method calls and processes each call it receives before allowing or denying the call. This technique can be used to implement a security zone by processing each call placed from the security zone to determine whether the called method is deemed safe for execution. As a result, access to an object may be restricted on a method call-by-method call basis.

In another aspect, the invention relates to operating a computer system to selectively process method calls. The process uses stored information about methods programmed in the computer system. As a method is called, the stored information is accessed for use in processing the call. The process may be used as part of an implementation of a security zone if the stored information indicates which method calls should be denied or allowed. The process also may be applied in other contexts, including as part of a system for logging execution of selected methods or for accumulating statistics on the cost of executing a program.

In another aspect, the invention relates to software for a computer that includes a mechanism to identify objects that have been instantiated indirectly from a zone in which special processing is desired. To track objects instantiated indirectly from a zone, an object may have a wrapper associated with it. The wrapper may store information that indicates whether the object was instantiated, either directly or indirectly, from the zone. Wrappers may be used in a process by which objects instantiate other objects. As one object instantiates another, each object inherits a value from its predecessor, which is stored in the wrapper. As chains of objects are formed, each object has the same value as the first object in the chain. If the root object in the chain is given a value indicating that the object was instantiated in the zone, every object in the chain will have the same value, identifying those objects instantiated from the zone. By using these stored indications as part of a process of restricting access to objects, the burden on code developers implementing a security zone is reduced because the code developer does not need to identify objects that could be indirectly instantiated or restrict access to a those objects not deemed safe for execution in the security zone.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

We have recognized that implementation of a security zone could be improved if the process for controlling access to objects were improved. Though it is known to only instantiate an object from within a security zone when the object implements a safe interface, even this precaution may not be adequate if a script executing in the security zone is given access to objects that were not instantiated from within the security zone. This condition can occur if an object returns another object. For example, a first object that implements the safe interface may, when one of its methods is called, instantiate a second object and return the second object to the script. If the second object is not deemed "safe," the script indirectly gets access to an unsafe object.

To avoid this result, the safety of each method may be verified on a method call-by-method call basis. If a call is made, the call is allowed to proceed only if the method being called is deemed to be safe. As is described in more detail below, in embodiments of the invention such a security zone may be implemented by intercepting method calls. If a method call is made from within a security zone, the called method is allowed to proceed if it is deemed safe, but access is blocked if the method is not deemed safe.

Additionally, a mechanism may be provided to identify objects instantiated indirectly from a script running in a security zone. In some embodiments, this mechanism may involve assigning a property to objects as they are instantiated. As each object is instantiated, it can inherit this property from the object that instantiated it. Giving a recognizable value of this property to objects instantiated directly in a security zone results in any object instantiated indirectly in the security zone inheriting this value. As a specific example of such a mechanism, a wrapper is provided for objects instantiated indirectly in a security zone. The wrapper stores information defining the property for the object, without requiring any changes to the definition of the object.

Figure 1:
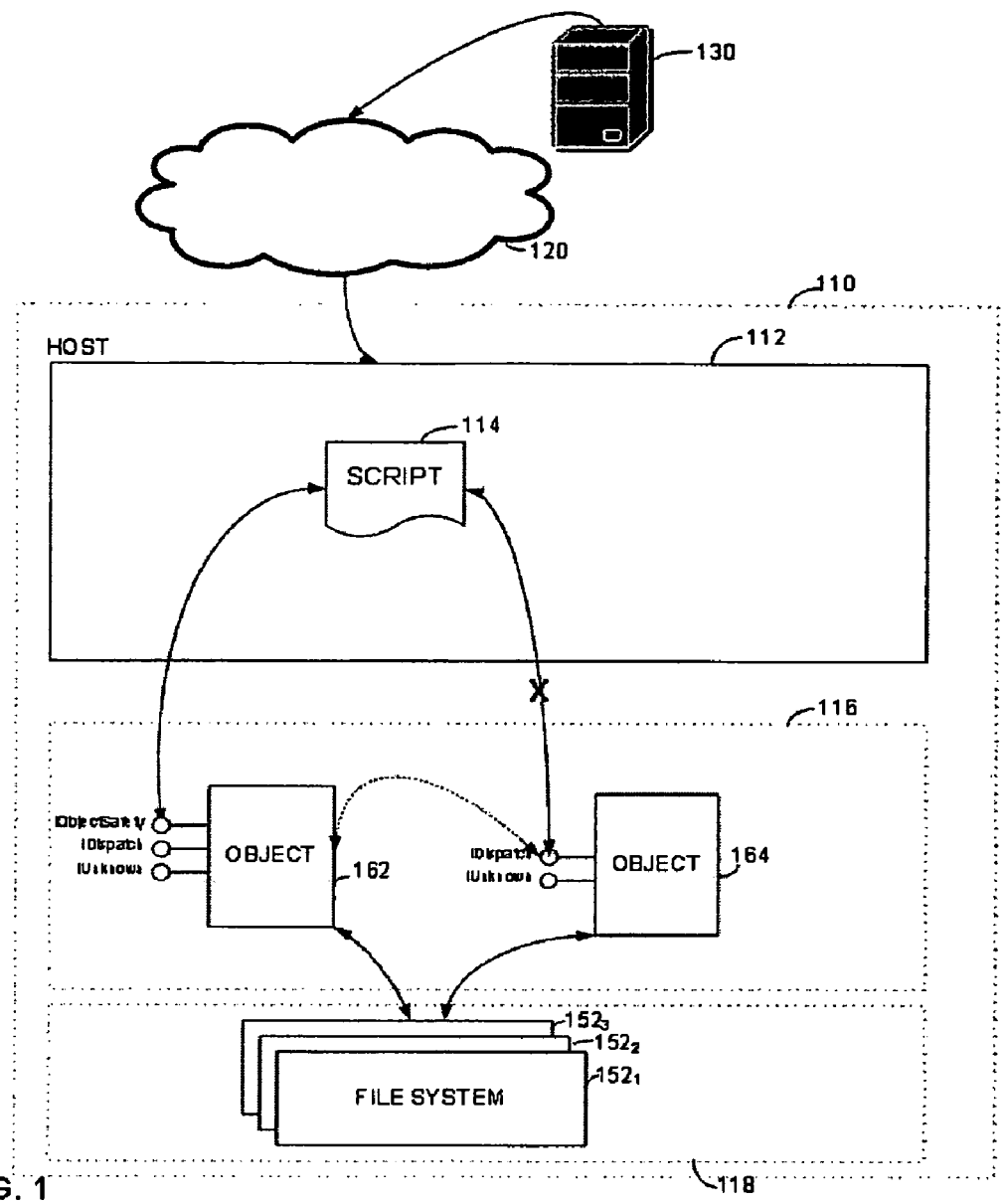
FIG. 1 is a sketch of a prior art computer system.

Turning to FIG. 1, a block diagram of a computer system 110 is shown. The block diagram of FIG. 1 is greatly simplified, showing only those aspects of the computer system relating to controlling access to objects discussed in connection with example embodiments of the invention.

Computer system 110 is shown in FIG. 1 to have access to Internet 120. Through Internet 120, computer system 110 may have access to a server 130. Computer system 110 may download information, including scripts, from server 130. As used herein, the term "script" refers to a collection of one or more computer executable instructions. Generally, a script is a relatively small program that is provided to a computer system to perform a single function or group of closely related functions. Often, scripts are provided by web pages to client computers accessing the web page to animate the web page or create a more interactive experience for the user. However, the invention is not limited to scripts of any particular size, function or purpose. Nor is the invention limited to scripts downloaded over the Internet.

Computer system 110 includes a host 112 that may execute a script 114. Here, host 112 is a software component that may be constructed according to conventional techniques to execute scripts. Host 112 may contain software sometimes called an "interpreter," a "just in time compiler" or a "virtual machine." Host 112 may perform functions in addition to executing scripts. In the example of a script downloaded from the Internet, host 112 may be a web browser. However, any suitable host may be used.

In the pictured embodiment, script 114 contains computer executable instructions that are interpreted by host 112 for execution. Steps in the execution of script 114 may include access to objects within computer system 110.

As described herein, objects are computer software components that may include methods that may be executed when calls are placed on the objects. Objects may be created as in a conventional computer system. In the illustrated embodiments, an instance of an object is created from an object definition when an object is instantiated in executing code, such as script 114. In the prior art example of FIG. 1, once an instance of an object is made available to executing code, that code may access methods in the object by placing a call on that object.

Object definitions may be provided in any of a number of ways. Object definitions may be provided as part of the operating system of computer system 110. Alternatively or additionally, object definitions may be loaded onto computer system 110 specifically to allow script 114 to execute or may be provided in conjunction with host 112. As another example, object definitions may be loaded as part of an application program unrelated to execution of script 112.

Here, the collection of object definitions within computer system 110 is pictured as object library 116. Object library 116 is here shown with two object definitions 162 and 164. However, object library 116 may contain definitions for many more objects, but only two object definitions are shown for simplicity. Furthermore, FIG. 1 shows a single object library 116. In implementing the invention, it is not necessary that all object definitions be stored in a single file or other location. Object library 116 may be regarded as a logical representation of a collection of objects available for access by a script 114 executing within host 112.

Object library 116 may contain definitions of objects that perform many functions used in execution of scripts on computer 110. The functions performed by objects within object library 116 may include access to system resources 118.

System resources 118 may contain components that interact with hardware or other software components of computer system 110. For example, a system resource 152, may implement a file management system. An object defined in object library 116 may contain methods that access the file management system to store or retrieve information. Other system resources may perform other functions. For example, system resources $152_2$ or $152_3$ may perform functions relating to interacting with a human user of computer system 110 or managing email. A computer system may have numerous system resources, though only three system resources $152_1$, . . . $152_3$ are shown for simplicity.

Each of the system resources may have one or more object definitions in object library 116 associated with it. These object definitions may contain methods that may be called to access functions of the system resource.

FIG. 1 provides as an example objects that are ActiveX® objects. Accordingly, objects are illustrated as implementing interfaces as are conventional for ActiveX® objects. However, any suitable type of object and any suitable form of interface may be used.

FIG. 1 shows object definitions 162 and 164 in object library 116 implementing different interfaces defined for ActiveX® objects. In this example, each object 162 and 164 implements an interface IDispatch and IUnknown. Implementing the interface IDispatch allows the object to be called from a host 112 that interprets instructions in a script, such as script 114. The IUnknown interface allows the object to be accessed from compiled code according to the COM standard.

Object 162 further implements an interface identified as IObjectSafety. The IObjectSafety interface is implemented in object 162 because the developer of object 162 provided it with a "safe mode" of operation. Any method of the object that may be called in the safe mode of operation object is deemed "safe" for execution in a security zone. In this example, a method is deemed "safe" if it cannot be used to disrupt operation of computer system 110 by altering files, improperly revealing information from the computer or otherwise performing operations that are detrimental to a computer system or its user. Though, a safe mode may be implemented in any suitable way. For example an object may be implemented so that when operating in safe mode it generates a user notification when any method accessing system resources 118 is called. The object may not execute any such method call unless it receives user authorization in response to the notification.

In contrast, object 164 does not implement the interface IObjectSafety. This difference between objects 162 and 164 impacts the way the objects may be accessed from a script 114 executing within host 112, allowing host 112 to implement a "security zone." In the example of FIG. 1, objects instantiated from object definition 162 may be accessed from the security zone but objects instantiated from object definition 164 may not be accessed.

As used herein, a "security zone" describes a collection of computer-executable instructions that are intended to have restricted access to other software components within computer system 110. In many instances, a security zone is implemented for scripts downloaded from the Internet, but can be implemented for any un-trusted code or in any other situation where it is desired that certain software have restricted access to other components of a computer system.

Script 114 may contain computer executable instructions that instantiate object 162. Upon interpreting such an instruction, host 112 accesses object library 116 to create an instance of object 162. If created from a security zone, the instance of object 162 will operate in a "safe mode." Thereafter, any calls on that object are made through the instance of the object. In this way, script 114 executing in the security zone has access to those methods of object definition 162 deemed safe for a security zone.

In contrast, object definition 164, because it does not contain the interface IObjectSafety, is not instantiated by host 112, even if script 114 contains an instruction to create an instance from that object definition. Any instruction within script 114 indicating that an instance of object 164 should be formed causes host 112 to generate an exception. Processing in response to such an exception may result in termination of execution of script 114 or other appropriate error-correcting steps. However, because no instantiation of object 164 is created, instructions within script 114 calling methods on object 164 should not be performed. In this way, the methods of object 164 deemed unsafe are not accessible to script 114 or other programs executing from within the security zone.

FIG. 1 also illustrates how script 114—despite the security zone—nonetheless may gain access to an object that can perform functions that are deemed unsafe. Though the security zone prevents script 114 from directly instantiating an object from object definition 164, such an object can be instantiated from a method of object 162. For example, script 114 could instantiate object 162, which could then be accessed from script 114. A method call on object 162 may result in object 164 being instantiated. The method called on object 162 may return the instantiation of object 164 to script 114. In this way, script 114 gains access to the instantiation of object 164, though the security zone implemented by host 112 would have prohibited direct access to object 164. Script 114 then may call methods on object 164 that access system resources 118 and may, either inadvertently or intentionally, disrupt operation of computer system 110.

Figure 2:
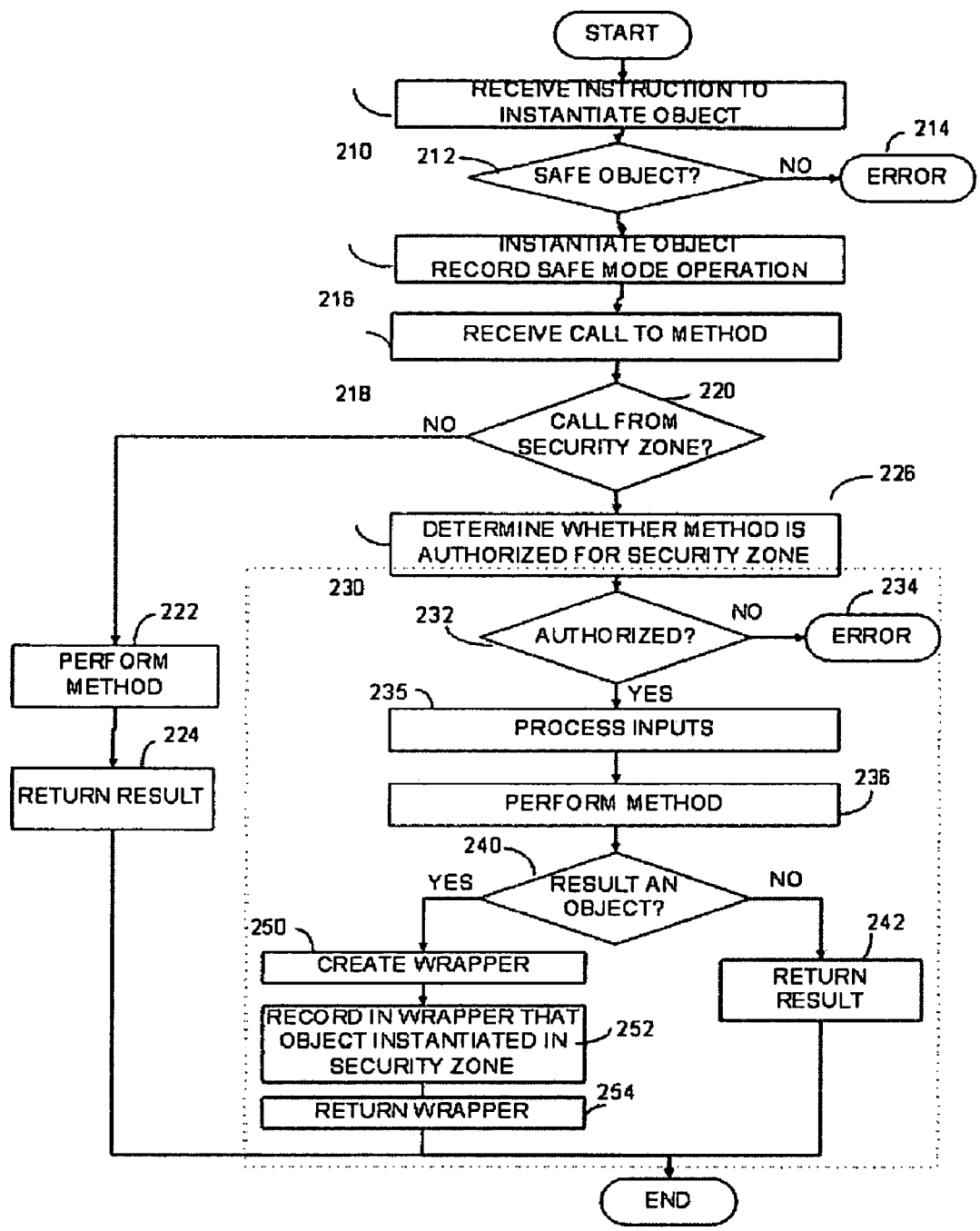
FIG. 2 is a flow chart illustrating operation of a computer system according to an embodiment of the invention.

FIG. 2 illustrates a process for operating a computer system according to an embodiment of the invention. The process avoids giving a script access to methods deemed unsafe through this indirect instantiation. The process of FIG. 2 allows access control of objects to be provided on a method call-by-method call basis. Regardless of whether an object is instantiated directly or indirectly from a security zone, if a call to a method deemed unsafe is placed on that object, the call may be denied or otherwise processed to restrict access to methods deemed unsafe.

The process steps of FIG. 2 may be performed by one or more software components within a computer system. In some embodiments, the process of FIG. 2 is performed by components within a web browser that interprets instructions in a script.

The process of FIG. 2 may begin with conventional steps for interpreting instructions in a script. At step 210, the process begins with an instruction to instantiate an object. Such an instruction may be encoded in a script.

The process proceeds to decision block 212. At decision block 212 a determination is made as to whether the object is safe for instantiation within a security zone. In the example, an object is deemed "safe" if it is defined with a restrictive interface, such as IObjectSafety. However, any suitable criteria may be employed to determine whether an object is safe.

If the object is not deemed safe, the process proceeds to termination point 214. Termination point 214 may involve generating an exception, executing an error handler or performing other steps to respond to an attempt by a script to instantiate an object not deemed safe for execution in the security zone. Processing of an attempt to instantiate an object not deemed safe for execution in a security zone may be as in a conventional computer system, but any suitable processing may be performed.

Conversely, if the object is deemed safe, processing proceeds to block 216. At block 216 the object may be instantiated. Instantiation of the object may be performed as in a conventional computer system, though any suitable mechanism may be used to instantiate the object. As in a conventional computer system, instantiation of an object from a security zone may include recording that the object is executing in a safe mode. Recording that an instance of an object is operating in safe mode may be achieved in any suitable way, but in the example that follows, each instantiation of an object has access to memory to store a value of a Boolean variable, here termed "SafeMode." The value of SafeMode is set to true when the instance is created to execute in safe mode.

A host may then execute further instructions within a script. Upon receiving a call to a method, processing continues at block 218. In some embodiments, calls to methods are received and processed by a component that intercepts all method calls made while processing a script. As in conventional systems that interpret scripts, an instruction specifying a method call is processed by calling a software component within the host, sometimes called a script engine. The script engine may fetch an object and acquire an interface to that object.

Often, interfaces to multiple objects in a software system are implemented with shared code that performs common processing steps. The shared code to implement an interface is here called an "invoker."

In prior art computer systems, an invoker implements one or more interfaces and receives as input a call instruction in a format appropriate for an interface implemented by the invoker. The invoker receives calls that contain arguments identifying a method and arguments to be passed when calling that method. The invoker parses this input information and determines a specific location within computer system 110 where the computer-executable code to perform the desired method is stored. The invoker then accesses this code, receives a result and formats the result to return it to the calling program through the interface implemented by the invoker.

An invoker according to an embodiment of the invention illustrated in FIG. 2 may perform any of the functions of an invoker as in a prior art system. However, the invoker used in the process of FIG. 2 may be constructed to perform processing based on a received method call. In the example of FIG. 2 in which a security zone is implemented, processing of a method call may determine whether the call should be allowed, denied or otherwise altered. Thus, each method call is conditionally processed by the invoker. In addition, when a method call is allowed, the invoker may process inputs to a method before calling the method or may process the results generated by the method prior to returning the results to the calling program.

The remaining steps in the process of FIG. 2 provide an example of conditional processing that may be performed by an invoker. At decision block 220, a decision is made whether the call has been made from a security zone. In some embodiments, a method call is deemed to be made from a security zone if the object on which the method call is placed has its SafeMode field set to true. As described above, every object instantiated, either directly or indirectly, in a security zone has a SafeMode field set to true. However, the determination of whether a call is made from a security zone may be made in any suitable way.

If the method call is not made from a security zone, processing proceeds to block 222. At block 222 the method is performed by allowing the call to be placed using conventional processing. At block 224 the results of performing the method are returned to the calling program and the process ends. Results may be formatted as in conventional call processing for return to the calling program.

Conversely, if the call is made from a security zone, sub-process 226 is performed in which the call may be conditionally executed or otherwise processed. Sub-process 226 begins at block 230. At block 230 a determination is made whether the called method is authorized for execution in the security zone. Any suitable mechanism for determining whether methods are authorized for execution in a security zone may be used. In some embodiments, developers of objects will identify the methods that are suitable for execution in a security zone using the same criteria that are conventionally applied to determine whether entire objects are safe for execution from a security zone. However, the determination at block 230 is provided on a method-by-method basis rather than for an entire object.

Processing then proceeds to decision block 232. At decision block 232 the process branches based on whether the called method is authorized for execution. If the called method is not authorized, processing proceeds to error termination 234. Any suitable processing may be performed at error termination 234. For example, processing at error termination 234 may result in the generation of an exception, execution of an error handler or other suitable response.

Conversely, if the called method is authorized for execution in the security zone, processing may proceed to block 235 where inputs to the method are processed prior to a call to the method. Any desired processing may be performed on the inputs, though in some embodiments, no processing on the inputs is performed. For example, such processing may be used to record input values as part of a performance monitoring application.

Regardless of whether the inputs are processed at block 235, processing then proceeds to block 236. At block 236 the method is performed. The method may be performed at block 236 in the same way that it is performed at block 222.

However, the result obtained from performing the method at block 236 may be further processed. In the pictured embodiment, decision block 240 further processes the result to determine whether the result is an object. Computer systems that process results of different types are known and such systems may process results differently depending on the type of the results. Conventional techniques may be employed to identify whether the result is an object. For example, an object may be identified if the result is a pointer of a specific format.

Regardless of the specific mechanism used to identify whether the result is an object, if the result is not an object, processing proceeds to block 242. At block 242 the result is returned to the calling program. The result may be returned at block 242 in a conventional fashion. Therefore processing at block 242 may be the same as processing performed at block 224.

However, if the result is an object, processing proceeds from decision block 242 to block 250. At block 250 a wrapper is created for the object that is generated as a result of performing the called method. Here, the term "wrapper" refers to a software component that is inserted between a wrapped software component and external components that may call it. The wrapper presents to the external components interfaces in the same form as the wrapped component. The wrapper in turn accesses the wrapped component through predefined interfaces. However, the wrapper may perform processing on a call from the external component prior to placing a call on the wrapped component or may process the result provided by the wrapped component before providing it to the external component.

In this example, the wrapper created at block 250 includes a storage location to record an indication that the object was created in a safe mode. At block 252, this SafeMode field is set to true.

Processing then proceeds to block 254. At block 254 the wrapper is returned as the result of performing the called method. Though an object may have been instantiated as a result of performing the called method, the calling program does not receive information about that object that would allow the object to be accessed directly. Rather, the calling program only receives information about the wrapper to the instantiated object. As a result, all subsequent calls made on that object will be made through the wrapper created at block 250.

Even though the instantiated object may contain no indication that it was created in a security zone, the wrapper will contain such an indication. As a result, any subsequent calls on methods within that object will be processed according to safe mode sub-process 226. By creating wrappers to store a SafeMode variable, an indication that security zone processing is required is transferred from one object to another, even if those objects are indirectly created in the security zone. Any further objects instantiated by the object will likewise be indicated to have been created for processing in a security zone.

Figure 3:
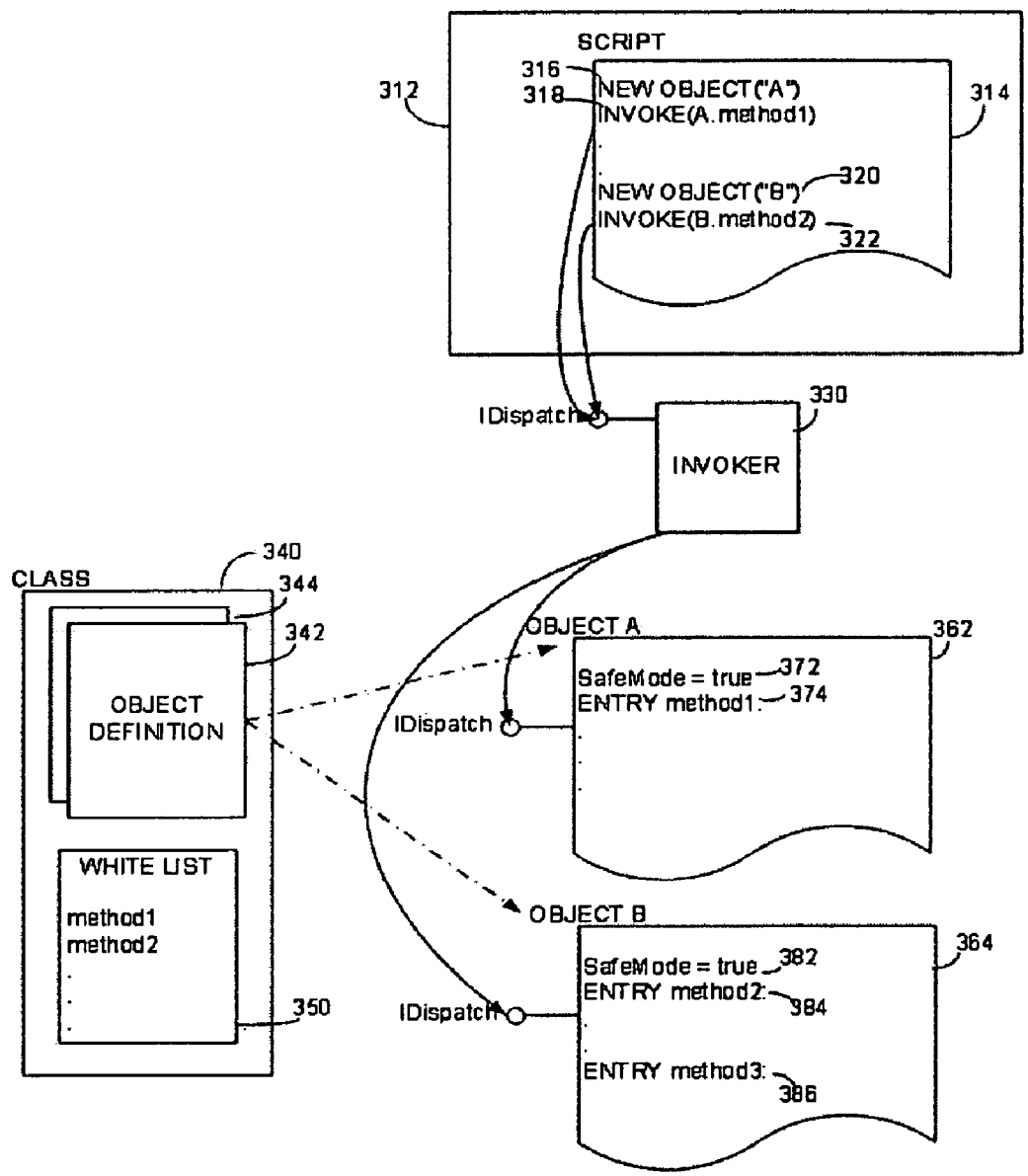
FIG. 3 is a software block diagram of a computer system incorporating an embodiment of the invention.

Turning to FIG. 3, a software architecture for a computer system capable of performing the process of FIG. 2 is illustrated. FIG. 3 shows a host 312. Host 312, for example, may be a web browser implementing a security zone in which a script 314 downloaded from the Internet is executed. In this context, script 314 may represent un-trusted code that should not be given access to objects that are deemed unsafe for execution by untrusted code.

However, alternative embodiments are possible. For example, host 312 may execute trusted code, such as signed C++ code. In this embodiment, processing of method calls may be performed to allow only the trusted code to access objects that manipulate system resources. Alternatively, processing in this embodiment may be performed to ensure that the trusted code does not access untrusted code.

Script 314 is here shown to include multiple instructions that are interpreted by host 312. The instructions illustrated in FIG. 3 are in a simplified form not intended to represent any specific programming language. Script 314 may be implemented with instructions in any suitable language to perform the described functions.

Instruction 316 is an instruction to instantiate an object identified as object A. Execution of instruction 316 causes an instance 362 of object A to be created. Instance 362 may be created from object definitions as in a conventional computer system. In this example, a computer-readable medium stores a class 340 containing object definitions. In FIG. 3, object definitions 342 and 344 are shown. Only two such object definitions are shown for simplicity, but a computer system may contain multiple classes, each containing multiple object definitions.

Upon execution of instruction 316, host 312 accesses class 340 to obtain the object definition appropriate for creating an instance of object A. Instruction 316 is written with a simplified syntax for purposes of illustration. An actual instruction specifying the instantiation of an object will include sufficient information to specify the appropriate object definition to use in the creation of an instance of the object, which may require more information than pictured in FIG. 3. In this example, object definition 342 is used to create an instance of the object.

Once an instance of an object is created, that instance may be set to operate in a safe mode because the instance was created in response to instructions executing within the security zone created by host 312. In this example, SafeMode field 372 within the instance 362 is set to true.

Instruction 318 is an instruction that calls a method, here denoted method1, on the instance of the object created in instruction 316. Host 312 may process instruction 318 in a fashion analogous to the processing of call instructions in a conventional system. In a conventional system, an instruction such as 318 is processed through a component implementing the IDispatch interface. Accordingly, FIG. 3 shows invoker 330 implementing an IDispatch interface so that instruction 318 is initially processed by invoker 330 as part of the access of an object through its IDispatch interface.

Invoker 330 differs from an invoker in a conventional system because it conditionally places a call to the method identified in instruction 318. In the embodiment shown, invoker 330 processes the call instruction 318 prior to placing a call to method 1 to determine whether the call should be allowed.

Invoker 330 processes the call instruction 318 to determine whether the method is authorized for execution in SafeMode. In the embodiment illustrated, invoker 330 determines whether the called method is authorized for execution in SafeMode from metadata associated with the object definition for the object containing the called method. In the example illustrated in FIG. 3, metadata is stored within class 340 as a white list 350. White list 350 contains a list of methods that are defined within class 340 that are authorized for execution in SafeMode. Upon finding method1 on white list 350, invoker 330 may allow a call on the instance 362 of object A so that method1 is performed.

FIG. 3 shows a single white list 350 for class 340 containing information about all methods defined in class 340. A white list may be provided for each class. However, a white list may be associated with any suitable level of the software hierarchy. For example, multiple white lists may be provided for each class, with one for each object definition. Alternatively, a white list may be associated with host 312 or with other software component in the computer system. Moreover, multiple white lists and/or multiple data structures storing metadata may be provided and consulted as part of the conditional processing on a method call.

In the illustrated embodiment, object A is an ActiveX® object and calls may be placed to executable code within an ActiveX® object through an interface. In this example, the call is placed through an interface IDispatch as in a conventional computer system, but other interfaces, such as IUnknown may be used. In this example, when objects are called through the IDispatch interface, invoker 330 intercepts the call and selectively allows the call to proceed if the called method is authorized for execution. If authorized, the call proceeds as in a conventional call to an ActiveX® object through the interface IDispatch. But, any suitable method for allowing the call to proceed may be used.

Script 314 may contain other instructions that access objects, which may be processed in a similar fashion. For example, instruction 320 is an instruction to instantiate an object B and instruction 322 is an instruction to call a method on the object B. Upon execution of instruction 320, host 312 may create instance 364 of object B in the same fashion that instance 362 of object A was created in response to instruction 316. In this example, object definition 344 within class 340 is used to create instance 364. As with instance 362, instance 364 contains a SafeMode variable that is set to true, indicating that instance 364 was created in response to an instruction executed from within a security zone. In this example, instance 364 also provides an entry to method 2, which is defined as part of object definition 344 used to create instance 364.

When instruction 322 is executed, a call is made on method2 in much the same way that a call is made on method1 in response to execution of instruction 318. Because both method1 and method2 are included on white list 350, both calls are allowed. However, each of the objects A and B may include methods not listed on white list 350. An attempt to invoke such a method from any code executed within host 312 will result in the call to that method being denied.

For example, object B is shown to contain an entry 386 for method3. In the embodiment illustrated in FIG. 3, method3 is not included on white list 350. Accordingly, any call to method3 will be denied. As discussed above in connection with FIG. 2, a call to an unauthorized method may be processed in any suitable way.

Figure 4:
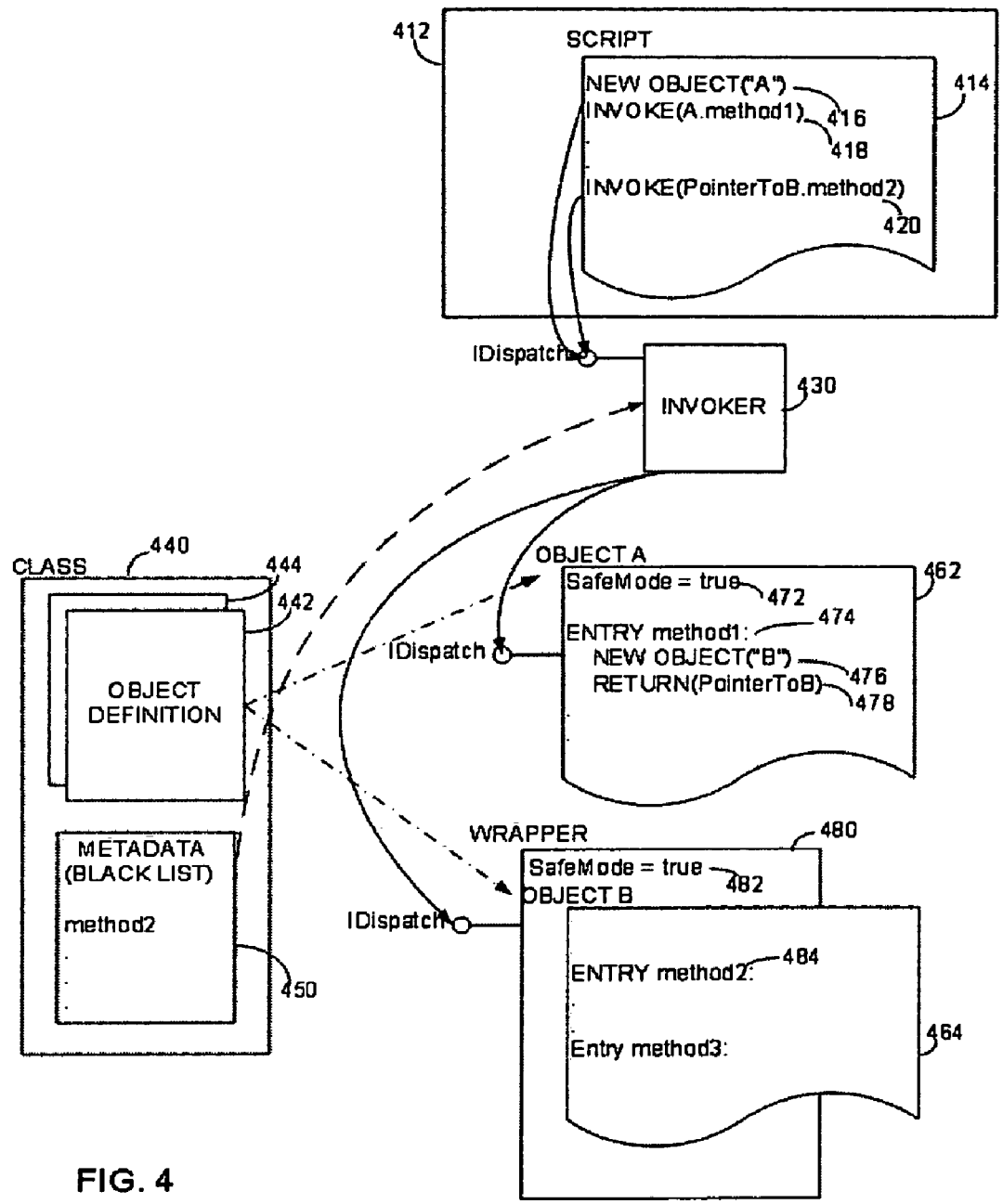
FIG. 4 is a software block diagram of a computer system incorporating an embodiment of the invention in an alternative operating state.

FIG. 4 shows an alternative embodiment of a computer system according to the invention. FIG. 4 shows a host 412 which may be implemented in the same fashion as host 312 (FIG. 3). Host 412 executes a script 414, which contains method calls that are processed by invoker 430. Invoker 430 may likewise be in the same form as invoker 330.

As with script 314 in FIG. 3, script 414 contains instruction 416 that instantiates an object A. In response to this instruction, instance 462 of object A is created from an object definition 442 within class 440. Because instruction 416 is executed from within a security zone, instance 462 contains a SafeMode variable 472 set to true.

When executed, instruction 418 calls a method1 within object A. In processing instruction 418, invoker 430 determines whether method1 is authorized for execution in the security zone implemented in host 412. In the embodiment of FIG. 4, class 440 contains metadata identifying methods authorized for execution. In this example, the metadata is a black list 450. Black list 450 contains a list of methods that are not authorized for execution in SafeMode. In this example, method1 is not included on black list 450. Accordingly, when instruction 418 is executed, invoker 430 allows the call to method1 to proceed.

In the scenario illustrated in FIG. 4, placing a method call on method1 within object A indirectly instantiates object B. In this example, method1 is shown to have an entry 474. Following entry 474, object B is instantiated by instruction 476. Execution of instruction 476 causes an instance 464 of object B to be created. Instance 464 of object B may be created in a conventional way.

After instance 464 is created in response to instruction 476 executed in method1, object B is returned at instruction 478 as the result of executing method1. In the embodiment illustrated, object B is represented by a pointer. However, any suitable data structure may be used to represent an object. To return an object following execution of method 1, instruction 478 returns the pointer to object B.

Invoker 430 may process each result to determine whether returning that result gives or could give script 414 access to unsafe code or other restricted portions of the software system. In the example of FIG. 4, object B may contain methods that may perform actions deemed unsafe. Processing within invoker 430 may analyze each method of object B to determine if any of the methods are "unsafe." Though any object returned may be deemed "unsafe" because of the potential that the returned object contains unsafe methods. Similar processing may be performed on arrays or other types of variables that may be unsafe.

Regardless of the specific mechanism used by invoker 430 to identify a return variable creating an unsafe result, invoker 430 may also take steps to ensure that script 414 does not get direct, unprotected access to that result. In the described embodiment, a wrapper is used to control access to a returned variable deemed unsafe.

Because instance 464 is deemed unsafe, invoker 430 creates a wrapper 480 for instance 464. Wrapper 480 represents a group of computer-executable instructions that provides an interface to object B. Wrapper 480 contains a field 482 for storing a bit indicating that wrapper 480 was created in Safe-Mode. Field 482 is set to true when wrapper 480 is created. Invoker 430 then returns wrapper 480 to the calling program rather than returning object B.

Following execution of instruction 418 within script 414, script 414 has information necessary to access object B. Accordingly, upon execution of instruction 420, which invokes method2 within object B, invoker 430 may process a call to method2. Though, in the pictured embodiment, access to object B is through wrapper 480.

As illustrated in FIG. 4, wrapper 480 provides an interface through which invoker 430 may be accessed in response to a method call placed on object B. The interface presented by wrapper 480 may be of the same form as the interface presented by other objects instantiated in a security zone. Thus, when calls are placed on object B through wrapper 480, invoker 430 may process those calls in the same way that it processes method calls placed on other objects. Placing a call on object B through wrapper 480 allows a check to be made whether that call is authorized in a security zone. In this example, wrapper 480 has a SafeMode variable 482 set to true, which causes invoker 430 to check whether any method call made through wrapper 480 is restricted. Thus, calls through wrapper 480 are processed as appropriate for safe mode execution. If the called method within object B is authorized for access within a security zone, invoker 430 will, upon processing such a call, access the code within object B that performs the called method. In the example of FIG. 4, method2 is listed on blacklist 450. Accordingly, as invoker 430 processes instruction 420, it denies the call to method2. Any suitable response may be taken upon denying a method call, including generating an exception or executing an error handler.

In the example illustrated, though object B was instantiated indirectly, the method call-by-method call authorization performed by the embodiment of FIG. 4 prevents method2 from being executed because it was not authorized for execution in the security zone. In this way, access control is implemented even for objects instantiated indirectly in a security zone.

Further, other than requiring objects to implement an interface with invoker 430, no special coding was required to create the definition of object B to provide the method call-by-method call access control illustrated in the embodiment of FIG. 4. Access to a whitelist 350, blacklist 450 or other metadata occurs within the invoker without any added coding in each object. By avoiding the need for special coding of objects executed from script 414, the burden on developers creating objects for use in the computer system in which scripts may be executed is reduced. Further, a computer system such as computer system 110 (FIG. 1) may include objects that are accessed by many types of programs in addition to a host 412 executing a script 414. Reducing the burden on a developer to implement access control on a method call-by-method call basis increases the chances that scripts executing within host 412 can take advantage of objects installed in a computer system by other programs.

Having thus described several aspects of at least one embodiment of this invention, it is to be appreciated that various alterations, modifications, and improvements will readily occur to those skilled in the art.

For example, the invention is illustrated by a web browser implementing a security zone. In such embodiments, each method call is processed to determine whether it is safe to execute. However, the described approach of intercepting and processing method calls may be applied in other contexts. For example, any program that executes scripts may be operated to intercept method calls so that processing may be performed on the method calls. As one example, a program logging method calls may intercept method calls. As another example, a program that intercepts method calls may compute costs of execution of a program or otherwise process method calls. Further, method calls may be selectively processed according to a white list, a black list or other suitable means.

Furthermore, the invention is not limited to processing of scripts. It may be employed in any context in which selective access to objects is desired.

Also, objects implementing a restricted interface are described to implement an interface known as IObjectSafety. This interface serves as an example applicable when ActiveX® objects are used. A security interface could be implemented in any suitable way. As one example, a single interface could be provided to place calls on an object regardless of whether it is operating within a security zone, but that interface may include a parameter that may be set to identify the operating mode.

Also, it is described that invoker 430 intercepts all calls made through an interface IDispatch. Invoker 430 may intercept calls made through additional or other interfaces. For example, invoker 430 may intercept calls through an interface IUnknown or IDispatchEx, or any other suitable interface.

Also, it was described that wrappers are created when a method call returns an object. Other return variables may likewise create security concerns and be returned within wrappers. For example, an unprotected object may be returned as an entry in an array. Invoker 330 or 430 may, for example, analyze each entry in an array to be returned as the result of a method call. Any entries containing unprotected objects may be replaced with wrappers to those objects. Alternatively, the invoker could simply disallow any return values containing arrays.

Similarly, a method may modify an input variable in a way that allows a calling program access to unprotected objects or other unsafe code. Invoker 330 or 440 may scan input variables to identify those that contain arrays that may be modified to allow access to unprotected objects. Calls with such input values may be denied or otherwise processed to avoid providing access to unsafe objects.

Such alterations, modifications, and improvements are intended to be part of this disclosure, and are intended to be within the spirit and scope of the invention. Accordingly, the foregoing description and drawings are by way of example only.

Further, the above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention, need not reside on a single computer or processor but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing, and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-readable medium having computer-executable components comprising:
  a) a plurality of objects, each object comprising a method;
  b) an interface component adapted to:
    i) receive a call to a called method in any of the plurality of objects,
    ii) perform processing in response to receiving the call; and
    iii) call the called method,
    wherein the interface component is adapted to:
    i) perform processing that determines whether the called method has been called, either directly or indirectly, from un-trusted code; and
    ii) if the called method has been called from un-trusted code, perform processing that determines whether the called method has been deemed suitable for execution by un-trusted code; and
    iii) selectively allow the call to the called method based on results of the processing;
  wherein:
    the method comprises a method of a plurality of methods;
    the computer-readable medium comprises information associated with each of the plurality of methods indicating whether each of the plurality of methods has been deemed suitable for execution by un-trusted code; and
    performing processing that determines whether the called method has been deemed suitable comprises accessing the information associated with the called method.

2. The computer-readable medium of claim 1, wherein each of the plurality of objects comprises an ActiveX object and the interface component implements an IDispatch interface.

3. The computer-readable medium of claim 1, wherein the interface component is further adapted to:
  iv) make a determination whether the called method should be executed; and
  v) selectively call the called method in response to the determination.

4. The computer-readable medium of claim 3, wherein selectively calling the called method comprises generating an exception in response to the determination indicating that the called method should not be called.

5. The computer-readable medium of claim 1, further comprising:
   c) a host component; and
   d) an operating system component, wherein the interface component is a portion of the host component and at least a portion of the plurality of objects access an operating system component.

6. The computer-readable medium of claim 5, wherein the host component is a web browser and the operating system component comprises a file management system.

7. A process of operating a computer system programmed with an object, the object having a method, the process comprising:
   a) associating information relating to the method with the object;
   b) upon a call to the method, consulting the information; and
   c) selectively processing the call based on the information, wherein:
      i) the object has a plurality of methods;
      ii) associating information with the object comprises identifying a subset of methods that are executable in a first scenario; and
      iii) selectively processing the call comprises initiating execution of the method based on whether the method is in the subset and generating an exception when the method is not in the subset.

8. The process of claim 7, wherein
   initiating execution of the method based on whether the method is in the subset comprises initiating execution of the method when the method is not in the subset.

9. The process of claim 7, wherein selectively processing the call comprises selectively storing second information about the method.

10. The process of claim 9, wherein selectively storing second information about the method comprises storing an indicator of a cost of execution of the method.

11. The process of claim 9, wherein selectively storing second information about the method comprises storing an indicator that the method was executed.

12. The process of claim 7, wherein:
   i) the method generates a return value; and
   ii) selectively processing the call comprises selectively creating a wrapper for the return value.

13. The process of claim 7, further comprising intercepting the call to the method to consult the information.

14. A computer-readable medium having stored thereon:
   a) a first data structure, comprising:
      i) at least one field containing a definition of a first object;
      ii) at least one field containing a definition of a second object;
   b) computer-executable components, comprising:
      i) a first object instantiated from the first object definition, the first object having associated therewith computer-executable instructions adapted to cause instantiation of a second object from the definition of the second object;
      ii) a second object instantiated from the second object definition;
      iii) a wrapper adapted to:
         A. receive a call to the second object;
         B. place a call to the second object; and
         C. store an indication of an operating state in which the second object was instantiated.

15. The computer-readable medium of claim 14, wherein the wrapper comprises an invocation component adapted to receive a call identifying the second object and invoke a method in the second object.

16. The computer-readable medium of claim 15, wherein the first object comprises a plurality of methods and the computer-readable medium further comprises:
   c) a second data structure having at least one field identifying methods within the first object operable in a security zone.

17. The computer-readable medium of claim 15, wherein the invocation component is adapted to selectively place a call on the wrapper when the call is to a method identified in the second data structure.

18. The computer-readable medium of claim 14, wherein:
   a) the second object has an operating state for operation within a security zone;
   b) the second object has an interface for accessing the second object in the security zone operating state; and
   c) the wrapper is adapted to place a call on the second object through the interface.

19. The computer-readable medium of claim 14, wherein:
   the wrapper stores the indication of the operating state by storing an indication that the second object was instantiated in a security zone when the first object was executing in the security zone when:
   the second object was instantiated, or
   the first object has an indication associated therewith indicating that the first object was instantiated in the security zone.

* * * * *